(12) United States Patent
Caba

(10) Patent No.: US 10,772,314 B1
(45) Date of Patent: Sep. 15, 2020

(54) PEST TRAP

(71) Applicant: Edward Caba, Beaverton, OR (US)

(72) Inventor: Edward Caba, Beaverton, OR (US)

( * ) Notice: Subject to any disclaimer, the term of this patent is extended or adjusted under 35 U.S.C. 154(b) by 219 days.

(21) Appl. No.: 16/020,238

(22) Filed: Jun. 27, 2018

(51) Int. Cl.
*A01M 1/04* (2006.01)
*A01M 1/14* (2006.01)

(52) U.S. Cl.
CPC ....... *A01M 1/145* (2013.01); *A01M 2200/012* (2013.01)

(58) Field of Classification Search
CPC A01M 1/04; A01M 1/08; A01M 1/10; A01M 1/14; A01M 1/145
USPC .................................. 43/113, 114, 121, 136
See application file for complete search history.

(56) References Cited

U.S. PATENT DOCUMENTS

| | | | |
|---|---|---|---|
| 4,566,220 A * | 1/1986 | Justice | A01M 1/145 43/113 |
| 4,654,998 A * | 4/1987 | Clay | A01M 1/145 43/113 |
| 4,686,789 A | 8/1987 | Williams | |
| 4,700,506 A | 10/1987 | Williams | |
| 4,918,856 A * | 4/1990 | Olive | A01M 1/145 43/113 |
| 4,979,329 A * | 12/1990 | Olive | A01M 1/145 43/113 |
| 5,044,112 A * | 9/1991 | Williams | A01M 1/145 43/113 |
| 5,111,610 A * | 5/1992 | Morisset | A01M 1/145 43/113 |
| RE34,402 E * | 10/1993 | Williams | A01M 1/145 43/113 |
| 5,259,153 A * | 11/1993 | Olive | A01M 1/145 136/291 |
| 2006/0080888 A1* | 4/2006 | Greening | A01M 1/145 43/113 |
| 2010/0071254 A1* | 3/2010 | Calkins | A01M 1/145 43/107 |
| 2012/0266519 A1* | 10/2012 | Wright | A01M 1/02 43/113 |
| 2013/0097918 A1* | 4/2013 | Coventry | A01M 1/106 43/107 |
| 2013/0298444 A1* | 11/2013 | Strube | A01M 1/145 43/113 |
| 2014/0137462 A1* | 5/2014 | Rocha | A01M 1/08 43/113 |
| 2014/0165452 A1* | 6/2014 | Rocha | A01M 1/08 43/113 |
| 2015/0020437 A1* | 1/2015 | Crawley | A01M 1/2016 43/113 |
| 2016/0066555 A1* | 3/2016 | Yans | A01M 1/14 43/114 |
| 2018/0184635 A1* | 7/2018 | Studer | F21K 9/00 |

* cited by examiner

*Primary Examiner* — David J Parsley
*Assistant Examiner* — Danielle A Clerkley
(74) *Attorney, Agent, or Firm* — Sanchelima & Associates, P.A.; Christian Sanchelima; Jesus Sanchelima

(57) ABSTRACT

A pest trap comprises a mounting platform and an adhesive coated cartridge. A solar panel is disposed within the mounting platform. The adhesive coated cartridge is detachably attached to the mounting platform. The adhesive coated cartridge comprises a light emitting diode (LED) electrically connected to the solar panel for attracting a pest.

12 Claims, 2 Drawing Sheets

PEST TRAP

BACKGROUND OF THE INVENTION

1. Field of the Invention

The present disclosure generally relates to trapping devices. More particularly, the present disclosure relates to a pest trap configured to trap a pest by attracting the pest using an illumination effect.

2. Description of the Related Art

Insect traps are known in the art to utilize electrically energized light sources to attract insects. Moreover, the use of adhesives beneath the light sources for trapping the insects is also known. However, existing electrically powered insect traps have the disadvantage of requiring a power source. As such, existing insect traps cannot be used for outdoor activities such as camping, night fishing, outdoor BBQs, etc., where they are required. For instance, an electrically powered insect trap is described U.S. Pat. Nos. 4,686,789 and 4,700,506. However, the type of insect trap described in the '789 and '506 patents also requires an electric utility power source or the like. Also, the structure described in these patents is not suitable for supporting the components and weight of a light energized insect trap as taught by the present invention. An insect trap that does not require an electrical utility power source is therefore desired.

Hence, there is a long felt but unresolved need for a device, which does not require an electrical utility power source. Moreover, there exists a need for a device, which is compact or of low complexity, has low manufacturing costs, and is easily customizable.

SUMMARY OF THE INVENTION

The invention, disclosed herein, addresses the above-mentioned need for a device, which does not require an electrical utility power source. Furthermore, the invention addresses the need for a device, which is of low complexity, has low manufacturing costs, and is easily customizable.

A pest trap comprises a mounting platform and an adhesive coated cartridge. A solar panel is disposed within the mounting platform. The adhesive coated cartridge is detachably attached to the mounting platform. The adhesive coated cartridge comprises a light emitting diode (LED) electrically connected to the solar panel for attracting a pest.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
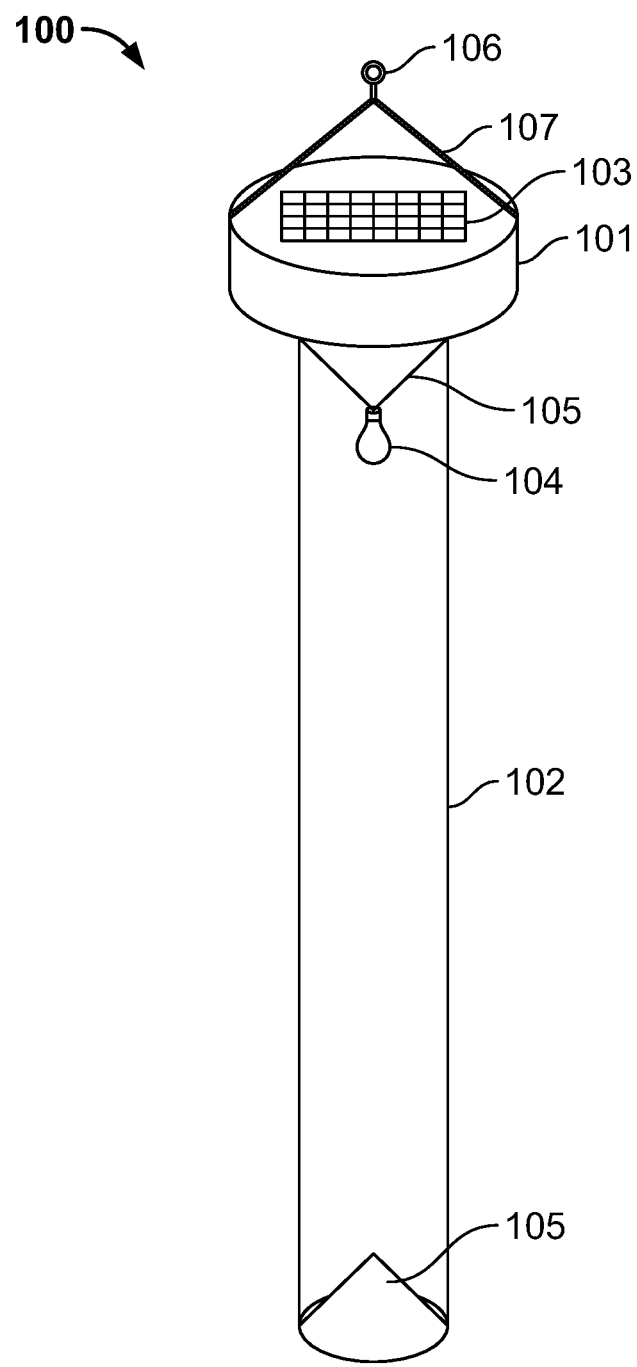
FIG. 1 exemplarily illustrates a perspective view of a pest trap.

FIG. 1 exemplarily illustrates a perspective view of a pest trap 100. The pest trap 100 comprises a mounting platform 101 and an adhesive coated cartridge 102. As used herein, "adhesive coated cartridge" may be construed to refer to a disposable and detachable cylindrical tube. The adhesive coated cartridge 102 is generally a transparent or tinted tube. In other embodiments, the adhesive coated cartridge 102 may be configured in a cuboidal, spherical, or hemispherical geometry. The adhesive coated cartridge 102 is coated with a sticky adhesive configured to trap pests, for example, insects and the like. The adhesive coated cartridge 102 is detachably attached to the mounting platform 101. A solar panel 103 is disposed within the mounting platform 101. The solar panel 103 serves to power a light source 104, for example, a light emitting diode (LED) or the like. The light source 104 is electrically connected to the solar panel 103 for attracting a pest. The adhesive coated cartridge 102 further comprises reflective surfaces 105 at both the upper and lower ends of the adhesive coated cartridge as exemplarily illustrated in FIG. 1. Additionally, the pest trap 100 is provided with hanging means. The hanging means may include a hook element 106 and a hanging thread 107, rope or the like. As such, the hanging means allow the pest trap 100 to be easily hung at a height preferred by the user.

Figure 2:
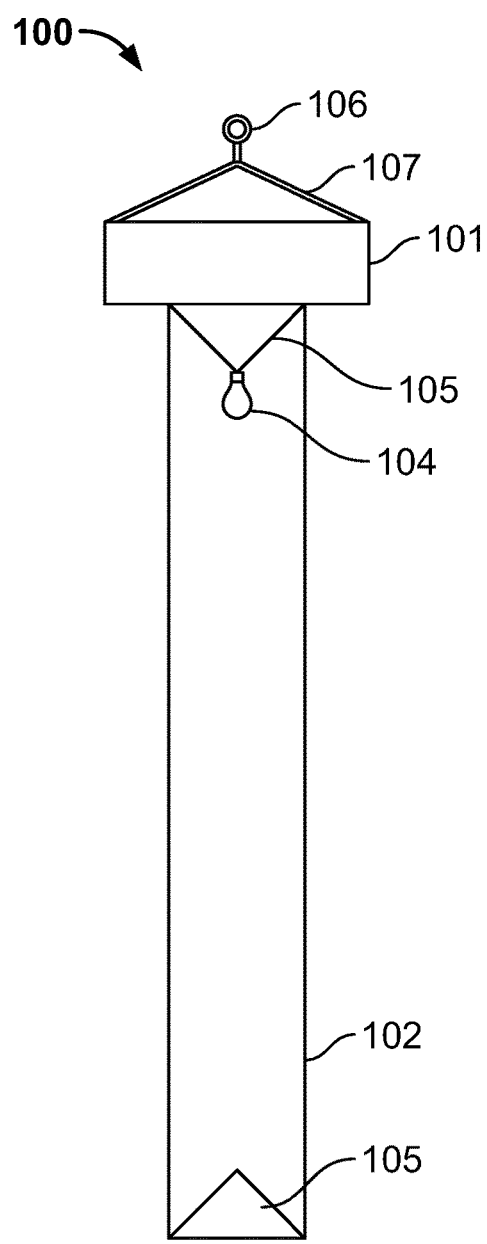
FIG. 2 exemplarily illustrates a side view of a pest trap.

FIG. 2 exemplarily illustrates a side view of a pest trap 100. The pest trap 100 comprises a mounting platform 101 and an adhesive coated cartridge 102. In accordance with an embodiment, the adhesive coated cartridge 102 is detachably attached to a lower end of the mounting platform 101. In an embodiment, the adhesive coated cartridge 102 may be of an approximate height of 10 to 12 inches and an approximate width of 2.5 inches. The adhesive coated cartridge 102 may be made of materials such as plastic, metals, glass, fiberglass or the like. Several manufacturing methods such as injection molding, lathe machining, etc., may be employed to fabricate the adhesive coated cartridge 102. The adhesive coated cartridge 102 is coated with sticky pest control glue. The pest control glue may be a non-toxic adhesive impregnated with aromas designed to be attractive to certain pests, for example, cockroaches, spiders, pest beetles, mites, scorpions, mosquitoes, etc. Alternately, the pest control glue may be odorless and colored to attract pests. It will be appreciated that the adhesive coated cartridge 102 may be manufactured in larger sizes and colors based on utility and design requirements. As such, the mounting platform 101 may also be manufactured to conform to the change in size effected in the adhesive coated cartridge.

Figure 3:
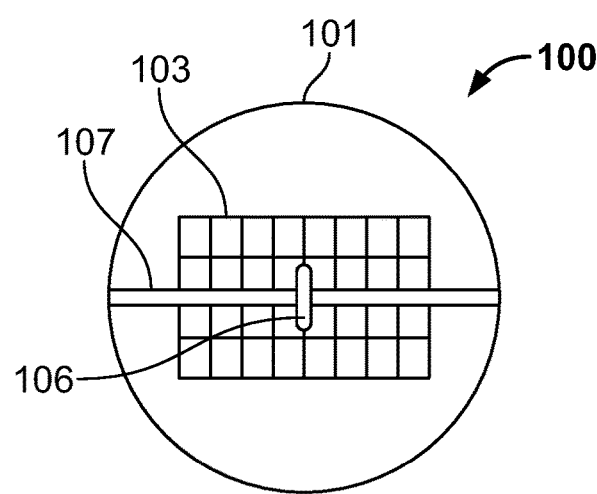
FIG. 3 exemplarily illustrates a top view of a pest trap.

The mounting platform 101 is configured to house a solar panel 103 as exemplarily illustrated in FIGS. 1 and 3. The light source 104 may include, for example, a light emitting diode, etc. Larger versions of the pest trap 100 may use other light sources, such as low power light bulbs and the like. The light source 104 functions to attract all types of flying insects. In an embodiment, the light source 104 is specifically designed to trap flying insects in indoor grow facilities, plantations, greenhouses, etc. In an embodiment, the adhesive coated cartridge 102 is provided with reflective surfaces 105 at the upper and lower ends of the adhesive coated cartridge 102. The reflective surfaces 105 serve to direct the insects to the sticky portion of the adhesive coated cartridge 102. The pest trap 100 is further provided with hanging means. The hanging means may include a hook element 106 and a hanging thread 107, rope or the like. Several other forms of hanging means may be envisioned by persons skilled in the art without deviating from the scope of the current disclosure.

FIG. 3 exemplarily illustrates a top view of a pest trap 100. The pest trap 100 comprises the mounting platform 101 and the adhesive coated cartridge 102 as exemplarily illustrated in FIGS. 1-2. The pest trap 100 is powered by a solar panel 103. The mounting platform 101 may be made of materials, for example, plastic, metal, glass, etc. Additionally, the mounting platform 101 may be grooved or include a recessed portion configured to conform to the shape and size of the solar panel 103. The solar panel 103 may be seated within the grooved or recessed regions provided on the mounting platform 101. In an embodiment, the adhesive coated cartridge 102 may be of distinct colors for different diffusion of light spectrums. Alternately, the adhesive coated cartridge 102 may be a clear/tinted tube. The pest trap 100 may be provided with a charging port sufficient to recharge a smartphone, electronic device, laptop, etc. As such, the pest trap 100 may be a useful equipment for outdoor activities such as camping, night fishing in a tent, outdoor BBQ, or camp-fires in yards. Moreover, the pest trap 100 may be used indoors during summer to catch insects. The pest trap 100 rids any given area of all flying insects at night or during the day without chemicals or the use of electricity.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A pest trap comprising:
a mounting platform configured to house a solar module; and
an adhesive coated cartridge detachably attached to a lower surface of the mounting platform, wherein said adhesive coated cartridge includes an inner portion having a top end and a bottom end, wherein a first reflective portion defining a conical shape is mounted to said top end of said inner portion, wherein said first reflective portion includes a light source mounted at a pointed end of the conical shape, wherein said light source is communicably connected to a solar module received with the mounting platform, wherein a second reflective portion defining a conical shape is mounted to said bottom end of said inner portion, wherein an outer surface of the adhesive coated cartridge is coated with an adhesive layer configured to securely restrain the one or more pests in contact with the outer surface of the adhesive coated cartridge.

2. The pest trap of claim 1, further comprising one or more fastening elements attached to the mounting platform for detachably fastening the pest trap to an external support member.

3. The pest trap of claim 2, wherein said fastening elements include a hook element and a hanging thread having two ends.

4. The pest trap of claim 3, wherein said two ends of said hanging thread are mounted to an edge of said mounting platform.

5. The pest trap of claim 3, wherein said hook element is mounted between said two ends of said hanging thread.

6. The pest trap of claim 1, wherein the mounting platform comprises a recessed portion for securely seating the solar module.

7. The pest trap of claim 1, wherein the light source is a light emitting diode (LED).

8. The pest trap of claim 1, wherein the adhesive coated cartridge is one of a cylindrical configuration, a cuboidal configuration, a pyramidal configuration, a spherical configuration, and a hemispherical configuration.

9. The pest trap of claim 8, wherein the adhesive coated cartridge is one of a transparent material, an opaque material, and a combination of a transparent material and an opaque material.

10. The pest trap of claim 1, wherein the adhesive layer is one of a toxic adhesive material and a non-toxic adhesive material.

11. The pest trap of claim 1, wherein said mounting platform includes a length that is less than a length of said adhesive coating cartridge.

12. A pest trap, comprising:
a) a mounting platform having a cylindrical shape, wherein said mounting platform including a recessed region on a top surface which receives a single solar panel having a rectangular shape, said mounting platform further including a mounting structure, wherein said mounting structure includes a hook element and a hanging thread having two ends, wherein said two ends of said hanging thread is mounted to an outer edge of said mounting platform, said hook element mounted between said two ends of said hanging thread; and
b) an adhesive coating cartridge having a cylindrical shape, wherein said cylindrical shape of said adhesive coating cartridge includes a diameter less than a diameter of said mounting platform, wherein said adhesive coating cartridge is coated with a sticky adhesive adapted to trap pests, wherein said adhesive coating cartridge includes an inner portion having a top end and a bottom end, wherein said top end includes a first reflective portion having a conical shape, wherein said first reflective portion includes a first pointed end pointing to said bottom end of said inner portion, said first pointed end having a light source mounted thereon, wherein said light source is communicably connected to said solar panel of said mounting platform, wherein said bottom end includes a second reflective portion having a conical shape, wherein said second reflective portion includes a second pointed end, wherein said second pointed end points toward said top end of said inner portion, wherein said light source is a light emitting diode.

* * * * *